United States Patent [19]

Christophliemk et al.

[11] 4,278,649
[45] Jul. 14, 1981

[54] CONTINUOUS PROCESS FOR THE PRODUCTION OF AMORPHOUS SODIUM ALUMINOSILICATE IN AN ELONGATED REACTION ZONE

[75] Inventors: Peter Christophliemk, Dusseldorf; Willi Wüst, Ratingen-Hoesel, both of Fed. Rep. of Germany

[73] Assignees: Henkel Kommanditgesellschaft auf Aktien, Dusseldorf-Holthausen; Deutsche Gold- und Silber-Scheideanstalt Vonmals Roessler, Frankfurt am Main, both of Fed. Rep. of Germany

[21] Appl. No.: 127,383

[22] Filed: Mar. 5, 1980

[30] Foreign Application Priority Data

Mar. 15, 1979 [DE] Fed. Rep. of Germany ....... 2910152

[51] Int. Cl.³ .................. C01B 33/26; C01B 33/28
[52] U.S. Cl. ............................ 423/329; 106/288 B; 423/328
[58] Field of Search .............. 423/329, 328, 330; 106/288 B

[56] References Cited

U.S. PATENT DOCUMENTS

| | | | |
|---|---|---|---|
| 2,882,243 | 4/1959 | Milton | 423/328 |
| 2,904,607 | 9/1959 | Mattox et al. | 423/328 X |
| 4,041,135 | 8/1977 | Williams et al. | 423/329 |
| 4,071,377 | 1/1978 | Schwuger et al. | 423/329 X |
| 4,073,867 | 2/1978 | Roebke et al. | 423/328 X |
| 4,213,874 | 7/1980 | Williams et al. | 423/329 X |

OTHER PUBLICATIONS

"Ullmanns Encyklopadie der Technischen Chemie" 4, Auflage, Band 3, pp. 350–352.

*Primary Examiner*—Edward J. Meros

*Attorney, Agent, or Firm*—Hammond & Littell, Weissenberger and Muserlian

[57] ABSTRACT

A process for the continuous production of an aqueous, alkaline suspension of x-ray amorphous sodium aluminosilicate having a small particle size of at least 99% by volume of a particle size of less than 50μ, suitable for conversion into zeolite sodium aluminosilicate of the smallest particle sizes, by mixing an aqueous sodium aluminate solution with an aqueous sodium silicate solution in the presence of excess sodium hydroxide solution at a temperature in the range of from 20° to 103° C., where the solutions being mixed have a mathematical total molar ratio of:

1.5 to 9 $Na_2O$ : 1 $Al_2O_3$ : 1 to 7 $SiO_2$ : 40 to 400 $H_2O$ consisting essentially of the steps of continuously passing one of said two aqueous solutions into the entrance of an elongated substantially circular cross-sectional reaction zone having a ratio of length to diameter of more than 500, continuously splitting the other aqueous solution into at least three partial streams, continuously passing the first of said partial streams into said entrance, continuously passing the mixed contents through said elongated reaction zone divided into a first zone where the mean holding time is from 5 to 60 seconds into a second zone of said elongated reaction zone, continuously passing the remainder of said partial streams separately into downstream zones of said elongated reaction zone, where said mean holding time of the reaction mixture in each of said separate zones of said elongated reaction zone is at least 5 seconds and sufficient to effect substantial mixing of said contents, the mean holding time in the entirety of said elongated substantially circular cross-section reaction zone being at least 3 minutes.

10 Claims, 1 Drawing Figure

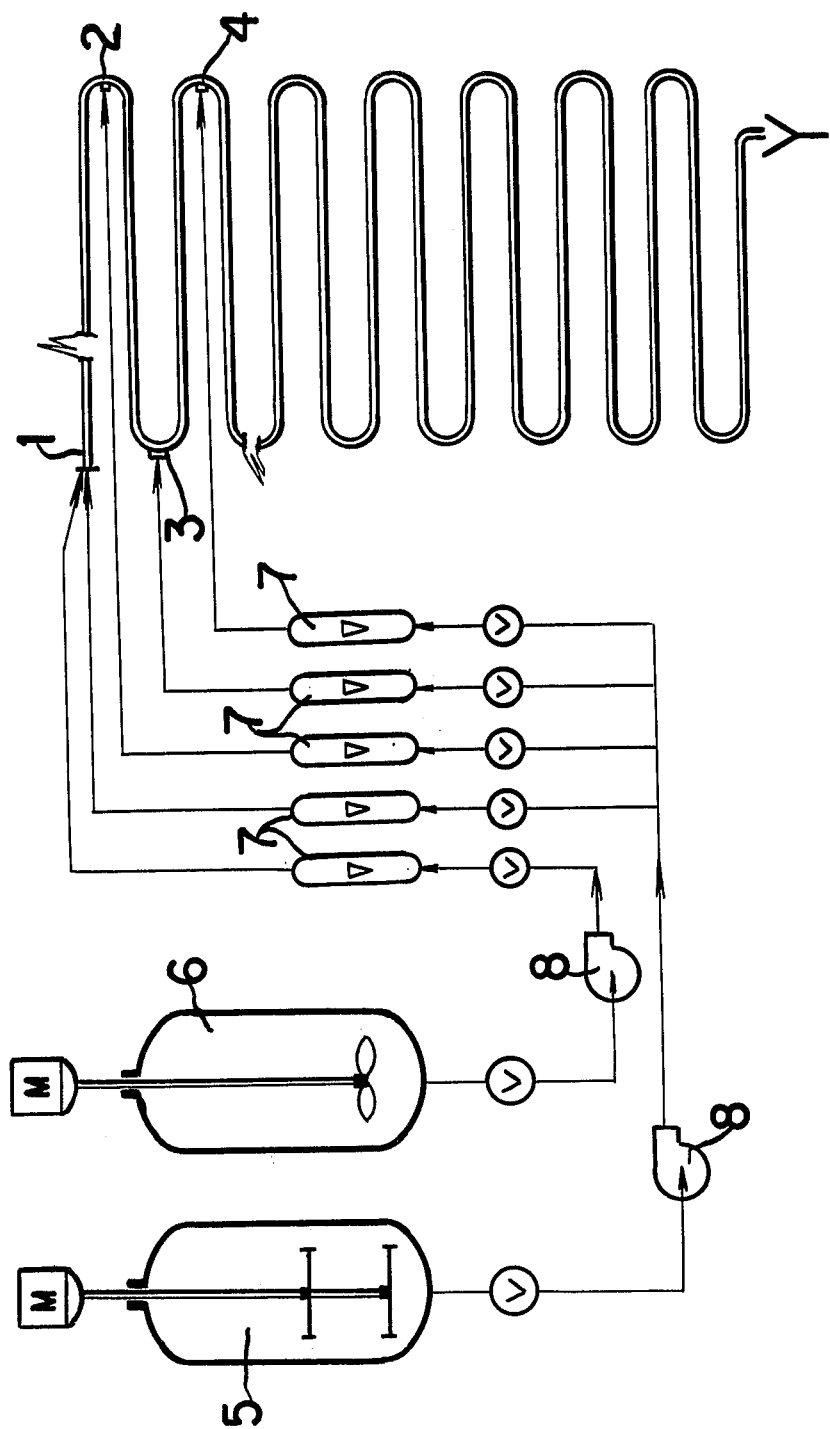

CONTINUOUS PROCESS FOR THE PRODUCTION OF AMORPHOUS SODIUM ALUMINOSILICATE IN AN ELONGATED REACTION ZONE

BACKGROUND OF THE INVENTION

The subject of the invention is a process for the continuous preparation of x-ray amorphous sodium aluminosilicates of small particle size, capable of conversion into zeolitic sodium aluminosilicates of smallest particle size, by mixing an aqueous sodium aluminate solution with an aqueous sodium silicate solution in the presence of excess sodium hydroxide solution above room temperature.

On mixing sodium aluminate solutions with sodium silicate solutions under the mentioned conditions, particularly at temperatures above 60° C., a precipitate of x-ray amorphous sodium aluminosilicate is formed instantaneously at all starting and concentration levels of the reaction partners commonly used in the technology. Of technological significance is especially the mixing solutions which give the following molar ratios of the reaction partners:

1.5 to 9 $Na_2O$:1 $Al_2O_3$:1 to 7 $SiO_2$:40 to 400 $H_2O$.

An alkalinity exceeding this, a higher silicate content or a greater dilution of the precipitation batch are not technologically meaningful. A water content of the batch lower than that given above results in especially pronounced formation of lumps in the precipitate as well as nonhomogeneous products.

Within the mentioned batch ratios, an amorphous sodium aluminosilicate precipitates always primarily from a large excess of sodium hydroxide solution, which precipitate has a chemical composition corresponding to the molar ratios of:

1 to 5 $Na_2O$.1: $Al_2O_3$:1.8 to 4 $SiO_2$.

After rinsing out the excess alkali, x-ray amorphous products are obtained with a chemical composition corresponding to the molar ratios of:

0.9 to 1.1 $Na_2O$:1 $Al_2O_3$:1.8 to 4 $SiO_2$ with a moisture content depending on the degree of drying. The silicate content of the precipitate depends largely on the molar ratio of $SiO_2$:$Al_2O_3$ in the precipitation batch.

The instantaneously forming precipitates of amorphous sodium aluminosilicate upon mixing of aluminate solutions with silicate solutions above room temperature lead to the formation of a gel-like reaction mixture that has no fluidity at first. This, in the one hand, makes a thorough and complete mixing of the two reaction components and thus also the obtaining of a homogeneous reaction product difficult and, on the other hand, delays also a subsequent crystallization of the amorphous product, if this is desired. Beyond this, the effect causes the formation of a relatively coarse-grained product containing large proportions with a particle diameter exceeding 50μ. With a batch precipitation of sodium aluminosilicate, the no longer fluid reaction mixture usually can be liquefied again by a sufficiently long application of strong shear forces. Until now, however, a continuous precipitation of amorphous sodium aluminosilicate was made impossible by the brief available time, due to the continuous process at technologically significant rates, which was inadequate to break up or crush the nonfluid reaction mixture sufficiently to reliquefy it.

OBJECTS OF THE INVENTION

An object of the present invention is the development of a continuous process for the production of an aqueous, alkaline suspension of an x-ray amorphous sodium aluminosilicate having a small particle size of at least 99% by volume of a particle size of less than 50μ.

Another object of the present invention is the development of a process for the preparation of amorphous sodium aluminosilicates that makes a continuous process with a high volume/time yield possible, even without the use of strong shear forces, with which the above-mentioned disadvantages can be avoided.

A further object of the present invention is the development of a process for the continuous production of an aqueous, alkaline suspension of x-ray amorphous sodium aluminosilicate having a small particle size of at least 99% by volume of a particle size of less than 50μ, suitable for conversion into zeolite sodium aluminosilicate of the smallest particle sizes, by mixing an aqueous sodium aluminate solution with an aqueous sodium silicate solution in the presence of excess sodium hydroxide solution at a temperature in the range of from 20° to 103° C., where the solutions being mixed have a mathematical total molar ratio of:

1.5 to 9 $Na_2O$:1 $Al_2O_3$:1 to 7 $SiO_2$:40 to 400 $H_2O$ consisting essentially of the steps of continuously passing one of said two aqueous solutions into the entrance of an elongated substantially circular cross-sectional reaction zone having a ratio of length to diameter of more than 500, continuously splitting the other aqueous solution into at least three partial streams, continuously passing the first of said partial streams into said entrance, continuously passing the mixed contents through said elongated reaction zone divided into a first zone where the mean holding time is from 5 to 60 seconds into a second zone of said elongated reaction zone, continuously passing the remainder of said partial streams separately into downstream zones of said elongated reaction zone, where said mean holding time of the reaction mixture in each of said separate zones of said elongated reaction zone is at least 5 seconds and sufficient to effect substantial mixing of said contents, the mean holding time in the entirety of said elongated substantially circular cross-section reaction zone being at least 3 minutes.

These and other objects of the invention will become apparent as the description thereof proceeds.

THE DRAWINGS

The FIGURE is a flow diagram of the process of the invention employing an elongated, substantially circular cross-sectional reaction zone or flowing tube reactor.

DESCRIPTION OF THE INVENTION

The subject of the invention is a process for the continuous preparation of an aqueous, alkaline suspension of x-ray amorphous sodium aluminosilicates of fine particle size that contain at least 99% by volume of a particle size of less than 50μ, which can be converted into zeolitic sodium aluminosilicates of smallest particle size, by mixing an aqueous sodium aluminate solution with an aqueous sodium silicate solution in the presence of an excess sodium hydroxide solution at temperatures in the range of 20° C. to 103° C., with the two solutions to be mixed having a mathematical total composition with respect to the molar ratios, of:

1.5 to 9 Na$_2$O:1 Al$_2$O$_3$:1 to 7 SiO$_2$:40 to 400 H$_2$O, which is characterized in that one of the two reaction components is added in a continuous stream into a mixing apparatus with a stage effect, and the other or second reaction component, divided into three or more partial streams the total dosage of which is predetermined by the mathematical total composition of the two solutions, is mixed with the first reaction component, the first partial stream being added immediately, continuously to the first reaction component, and the other partial streams being dosed, also continuously, but downstream, into the stream of the formed reaction mixture, always after a mean holding time of the reaction partners in the stage of the mixing apparatus of at least 5 seconds.

More particularly, the present invention involves a process for the continuous production of an aqueous, alkaline suspension of x-ray amorphous sodium aluminosilicate having a small particle size of least 99% by volume of a particle size of less than 50μ, suitable for conversion into zeolite sodium aluminosilicate of the smallest particle size, by mixing an aqueous sodium aluminate solution with an aqueous sodium silicate solution in the presence of excess sodium hydroxide solution at a temperature in the range of from 20° to 103° C., where the solutions being mixed have a mathematical total molar ratio of:

1.5 to 9 Na$_2$O:1 Al$_2$O$_3$:1 to 7 SiO$_2$:40 to 400 H$_2$O consisting essentially of the steps of continuously passing one of said two aqueous solutions into the entrance of an elongated substantially circular cross-sectional reaction zone having a ratio of length to diameter of more than 500, continuously splitting the other aqueous solution into at least three partial streams, continuously passing the first of said partial streams into said entrance, continuously passing the mixed contents through said elongated reaction zone divided into a first zone where the mean holding time is from 5 to 60 seconds into a second zone of said elongated reaction zone, continuously passing the remainder of said partial streams separately into downstream zones of said elongated reaction zone, where siad mean holding time of the reaction mixture in each of said separate zones of said elongated reaction zone is at least 5 seconds and sufficient to effect substantial mixing of said contents, the mean holding time in the entirety of said elongated substantially circular cross-section reaction zone being at least 3 minutes.

The dividing or splitting of the second reaction component into several partial streams, which are mixed separately from each other with the stream of the first reaction component or with the reaction mixture, is essentially important for the process of the invention. While the first reaction component flows continuously in an undivided stream into the first stage of the flowing tube reactor, the second component is added continuously, simultaneously, at first only in a less than adequate amount, based on the mathematical total composition of the two solutions to be mixed, to the stream of the first reaction component, and the rest of this second reaction component is dosed continuously in several portions, in each instant with a delay in time, only into the stream of the already present reaction mixture.

A considerable extension of the precipitation time of the amorphous sodium aluminosilicate can be achieved by the splitting of one of the two reaction components in a technically simple manner; as immediate consequence of this effect, the formation of a no longer fluid reaction mixture is effectively prevented, even without the application of strong shear forces. The use of the continuous process according to the invention thus results in a properly fluid homogeneous suspension of fine, amorphous sodium aluminosilicate particles capable of crystallization, of which at least 99% by volume are smaller than 50μ.

It is to be taken into consideration that the total dosages of the two reaction partners are determined by the mathematical total composition of the solutions to be mixed.

Preferred according to the invention are precipitation batches in which the two solutions to be mixed have a mathematical total composition, with respect to the molar ratios, of form:

1.5 to 6 Na$_2$O:1 Al$_2$O$_3$:1.3 to 2.5 SiO$_2$:40 to 150 H$_2$O, especially in the range of from:

3 to 5.5 Na$_2$O:1 Al$_2$O$_3$:1.7 to 2 SiO$_2$:70 to 110 H$_2$O.

The amorphous products freed from excess alkali then exhibit a chemical composition corresponding to molar ratios of:

0.9 to 1.1 Na$_2$O:1 Al$_2$O$_3$:1.8 to 2 SiO$_2$ with a water content dependent on the degree of dryness.

On the other hand, the amorphous precipitation products still containing excess alkali are characterized by the fact that they are readily convertible into highly crystalline sodium aluminosilicates of various types. The above-mentioned preferred precipitation batches result, by crystallization of the amorphous primary product, in zeolitic molecular sieves of the NaA type, having the smallest grain size, with the proportion of granule sizes below 10μ exceeding 95% by volume and wet screening residues larger or equal to 50μ in amounts of less than 1% by weight. The chemical composition of the molecular sieve NaA, a sodium aluminosilicate of special technical significance, corresponds to the empirical formula:

1±0.2 Na$_2$O.1 Al$_2$O$_3$.2±0.2 SiO$_2$.0 to 6 H$_2$O

The x-ray diffraction pattern normally used for the identification of the molecular sieve NaA is given in the German published application DE-AS 10 38 015 and DE-AS 10 38 017, for example.

As explained earlier, the splitting of one of the two reaction components into at least three partial streams and mixing them stepwise with the other reaction component in a continuous manner causes a considerable lowering of the viscosity of the reaction mixture from an initial mixing of the entirety of the two components and thus its improved fluidity. In keeping with the intent of the process according to the invention, it is of advantage here that only 40% to 60% of the latter or second reaction component, based on the ratio of the two solutions predetermined by the mathematical total composition, are added continuously in the form of the first partial stream, to the stream of the former or first reaction component. The rest of the latter or second reaction component is then advantageously dosed downstream, in two to four partial streams, into the stream of the already formed reaction mixture, with the individual partial streams containing respectively equal or smaller percentages of the latter or second reaction component, also based on the ratio of the two solutions predetermined by the mathematical total composition. A splitting into more than five partial streams requires a greater technical expense with respect to dosing, without producing marked advantages with respect to process or product. Thus the splitting of one of the two reaction components into three to five partial streams is preferred for the continuous precipitation of amorphous sodium aluminosilicate according to the invention.

Principally, either of the two components, that is, either the aluminate solution or the silicate solution, can be split into the partial streams. However, according to the invention, the splitting of the aluminate solution, as the latter or second reaction component, into partial streams is preferred since this process results in reaction products of especially small particle size.

As concerns the precipitation temperature, the mixing of the two reaction components at a temperature that is kept constant except for deviations of ±2° C., preferably in the range of from 50° C. to 80° C., is advantageous in the process according to the invention.

The flowing tube reactor with a staged effect in the sense of the invention, is a reactor that permits a continuous mixing of the reaction partners along a reaction course as well as the addition of one of the reaction partners in the form of partial streams, with the "phased effect" characterizing a restriction of the forward or backward streaming of the individual components of the reaction mixture in the flowing tube reactor.

As concerns the dimensions of the flow tube reactor, the chosen number of partial streams of the latter or second reaction component, must be taken into consideration besides the desired throughput on the one hand, as well as the mean holding time of the reaction partners within the entire flowing tube reactor required for an optimal mixing on the other hand. The mean holding time is determined by the total volume of the solutions flowing into the flowing tube reactor per mixer volume (taking into consideration the dead space) and time.

According to the process according to the invention, the individual partial streams of the latter or second reaction component are introduced respectively into different sections of a elongated, substantially circular cross-sectional reaction zone of flowing tube reactor that has a ratio of length to diameter of more than 500.

The reaction volume of the flowing tube reactor (or "flow tube") is formed by a tube with a length that is usually very great in comparison with its diameter. The initial mixture, or the reactants, enters at one end of the tube, the final mixture is removed at the other end. For the ideal flow tube, the assumption is made that no mixing takes place between the individual volume elements of the reaction mixture in the flow direction and that the composition of the reaction mixture is constant at any point of the tube across the cross-section. These conditions can be described in a first approximation by the assumption of a so-called piston or plug flow. The changes in concentration along the tube (i.e., mixing) are dependent on the throughput as well as the length.

The distribution of the holding time of an actual flowing tube reactor differs from that of an ideal tube and is dependent on the Reynolds number, tube curves, tube profile, attachments built into the tube, rough walls, flow conditions at the intake and outlet of the tube, viscosity differences in the reaction mixture and similar parameters. Knowledge of the holding time distribution in a given tube reactor can be obtained either by measuring or by choosing the operating conditions so that they are largely ideal.

Data for the assembling and operating of tube reactors, including their mathematical treatment, can be obtained from manuals of chemical engineering, especially "Ullmanns Encyklopadie der technischen Chemie," 4, Auflage, Band 3 (4th Edition, Volume 3); "Verfahrenstechnik II und Reaktionsapparate," 1973, Verlag Chemie, pp. 350–352, incorporated herein by reference.

According to the invention, the total stream of the former or first reaction component as well as the first partial stream of the latter or second reaction component are introduced simultaneously, continuously at one end of the flowing tube reactor, with the aid of suitable dosing devices. Downstream, an additional partial stream of the split latter or second reaction component is fed into the formed reaction mixture, always after a mean holding time of 5 to 60 seconds within the section or sections of the flowing tube reactor between the various feed inlets. The mean holding time in the mixing flowing tube reactor remaining after complete introduction of all components should be at least three minutes.

It is preferable to allow the total product stream, that is, the stream of the former or first reaction component on the one hand, and the partial streams of the latter or second reaction component on the other hand, to flow into the tube reactor with a dosing rate of 2 to 20 m$^3$ solution, preferably more than 3 m$^3$ solution, per cubic meter of mixer volume and per hour, with the mean holding time of the reaction partners in the flowing tube reactor amounting to a total of 3 to 30 minutes, preferably 5 to 20 minutes.

Various properties of the liquid reactor mixture change during the precipitation and mixing processes in the flowing tube reactor especially its viscosity, which passes through a distinct maximum. Thus it may be advantageous that the flowing tube reactor does not have a constant tube diameter. The diameter can be varied in such a manner that optimal flow conditions are achieved in dependence on the respective flow characteristics (mainly the viscosity). The reactor volume can be enlarged in this manner, without any extension of the length of the tube.

The flowing tube reactor itself as well as the feed lines can be surrounded completely or partially with a heating mantle for steam, hot water or other conventional heat exchange media. The continuous precipitation thus can be carried out largely isothermically, that is, with a tolerance of +2° C. and heat reflection can be corrected. If desired, the area at the following tube reactor mixer outlet may also be covered with an additional mantle, either to cool the precipitation product or to raise the temperature from the precipitation temperature to the necessary crystallization temperature.

The continuously prepared amorphous sodium aluminosilicate can be crystallized in the smallest molecular sieve particles of type NaA by heating to a temperature of 85° C., for example. The time needed for crystallization is very short. Details about carrying out the crystallization as well as about the properties of the crystalline products are given in the following examples. If the subsequent crystallization of the amorphous reaction product is to be omitted, this is worked up directly. For the working up of the amorphous as well as of the crystalline products, the mother liquor is first filtered off. The products are then washed and dried, depending on the requirements for their intended use, or finished in some other, conventional way, if desired. Mother liquor and wash liquids can be returned into the process.

The obtained sodium aluminosilicates, particularly the molecular sieve NaA, finds application preferably as heterogeneous inorganic builders (phosphate substitutes) in washing, rinsing and cleaning agents.

The performance of the process according to the invention is explained in more detail in the following examples.

EXAMPLES

A flowing tube reactor with a total volume of 200 liters and a tube diameter (inside) of 38 mm was used for the examples; 44 U-shaped bends at intervals of approximately 4 meters made the reactor compact in form, requiring an area of only 20 square meters. The tube reactor was completely enclosed by a heating mantle (hot water), which was subdivided into a total of ten zones for variable heating (always the given precipitation temperature in the examples). A schematic flow diagram of the overall process including the flowing tube reactor is shown in the FIGURE.

The component that was not split as well as the main stream of the component to be split (first partial stream) were fed respectively into the intake of the flowing tube reactor 1. The point of introduction 2 for the second partial stream of the split component was 5 m further downstream, the points of introduction 3 and 4 for the partial streams 3 and 4 were respectively 3 m further downstream. The starting components were stored in large tanks 5 and 6 and heated to the given precipitation temperature. The dosing of the partial streams as well as of the unsplit main stream was performed with separately calibrated dosing devices 7 (dispensing equipment for suspended materials). The components were transported by centrifugal pumps 8.

The experimental procedure, which is suitable for the separation of one of the two components into up to four partial streams, can be seen from the simplified flow diagram according to the FIGURE.

The aluminate solutions were prepared from moist hydrargillite with 58% $Al_2O_3$ or from technical grade sodium meta-aluminate (95% pure, 54% $Al_2O_3$ and 41% $Na_2O$) with the addition of technical grade 50% sodium hydroxide solution and deionized water. The silicate component was prepared from technical grade water glass solution (8% $Na_2O$, 26.9% $SiO_2$), technical grade 50% sodium hydroxide solution as well as recycled mother liquor. The aluminate and silicate solutions were filtered prior to their use, the concentrations of alkali, aluminate or silicate were determined analytically.

Samples were removed from the continuously discharging product stream and crystallized separately under laboratory conditions for the determination of the ability of the obtained amorphous sodium aluminosilicate to crystallize. For this purpose, 1,500 gm of the suspension obtained were agitated in a 2-liter, three-necked flask with heating unit, contact thermometer, mounted reflux condenser and agitator, at 85° C.

After the completed crystallization, the solids were separated by filtration and washed with deionized water heated to 60° C. until the wash water had a residual alkalinity corresponding to pH 9 to 10.

For characterization, the washed products were dried overnight at 100° C. in a vacuum oven, well ground and identified by their x-ray diagrams. The composition with respect to $Na_2O$, $SiO_2$ and $Al_2O_3$ was determined by x-ray fluorescence analysis. The loss of moisture on heating for one hour at 800° C. was recorded as the moisture content. The crystal habit was determined by the scanning electron microscope, the granule size distribution by the Coulter counter, the wet screening residue according to Mocker, with the use of a $25\mu$ screen according to DIN 53580 (slurry of 1 gm of active substance in 100 ml of deionized water, homogenized for one minute in the ultrasonic bath, five minutes wet screening with water pressure of 4 bar and a flow rate of 400 liters of water per hour, reweighing of dried screens).

The calcium-binding capacity (CaBC) of the dried products was determined according to German Published Application DE-OS 2,412,837 (page 27) after ten minutes at 22° C. ±2° C. with 1 gm active substance per liter and 30° dH (German hardness) initial hardness, and recorded as "mg CaO/gm AS" (AS=active substance).

EXAMPLES 1a TO 1k

In these examples, only the concentrations and amounts of the used sodium aluminate solutions and sodium silicate solutions were varied, while the other precipitation conditions remained the same. The precipitations were performed in the described flowing tube reactor. The aluminate solutions were prepared from moist hydrargillite.

The silicate solution was (without splitting into partial streams) pumped continuously, at the concentrations given in Table 1, into the intake of the tube reactor. The aluminate solution was split into four partial streams: one stream with 50% of the total amount required according to Table 1 was led continuously to the point of introduction 1, one stream of 30% of the total amount to point of introduction 2, and two streams of 10% each of the total amount to the points of introduction 3 and 4 of the flowing tube reactor.

The amorphous reaction mixture leaving the tube reactor continuously had a temperature of 65° to 67° C., was always homogenous and had good fluidity. The proportions of granules exceeding 50 μm were below 1% by weight.

The products obtained from this after 40 minutes of crystallization were identified in all cases as highly crystalline-molecular sieve NaA still containing bound water and having a chemical composition corresponding to molar ratios of:

1.0 $Na_2O$:1.0 $Al_2O_3$:1.8–2.0 $SiO_2$.

The Ca-binding capacity was above 160 mg CaO/gm active substance. All products had an average particle size of below $7\mu$ and granule size proportions of less than $10\mu$ exceeding 95% by volume. The wet screening residue according to Mocker was less than 1% by weight.

The following Table 1 shows examples with various total molar ratios in the precipitation batch and variation of the total throughput (precipitation at 65° C., splitting of the aluminate component corresponding to 50%+30%+10%+10%, respectively).

TABLE 1

| Example | Aluminate Solution | | | Silicate Solution | | | Total Molar Ratios in the Precipitation Bath Based on $Al_2O_3 = 1$ | | | Total Throughput kg/hr | Average Particle Size in μ |
|---|---|---|---|---|---|---|---|---|---|---|---|
| | % $Al_2O_3$ | % $Na_2O$ | Dosing kg/hr | % $SiO_2$ | % $Na_2O$ | Dosing kg/hr | $Na_2O$ | $SiO_2$ | $H_2O$ | | |
| 1a | 12.92 | 14.06 | 592 | 12.35 | 7.85 | 474 | 2.6 | 1.3 | 60 | 1066 | 4.2 |
| 1b | 12.92 | 14.06 | 711 | 12.35 | 7.85 | 569 | 2.6 | 1.3 | 60 | 1280 | 4.7 |

TABLE 1-continued

| | Aluminate Solution | | | Silicate Solution | | | Total Molar Ratios in the Precipitation Bath Based on $Al_2O_3 = 1$ | | | Total Throughput kg/hr | Average Particle Size in μ |
|---|---|---|---|---|---|---|---|---|---|---|---|
| Example | % $Al_2O_3$ | % $Na_2O$ | Dosing kg/hr | % $SiO_2$ | % $Na_2O$ | Dosing kg/hr | $Na_2O$ | $SiO_2$ | $H_2O$ | | |
| 1c | 12.92 | 14.06 | 395 | 13.11 | 12.19 | 458 | 3.6 | 2.0 | 70 | 853 | 4.2 |
| 1d | 12.92 | 14.06 | 592 | 13.11 | 12.19 | 686 | 3.6 | 2.0 | 70 | 1278 | 4.0 |
| 1e | 12.43 | 17.38 | 410 | 10.26 | 7.66 | 525 | 3.6 | 1.8 | 80 | 935 | 3.9 |
| 1f | 12.43 | 17.38 | 546 | 10.26 | 7.66 | 700 | 3.6 | 1.8 | 80 | 1246 | 4.0 |
| 1g | 10.12 | 18.45 | 504 | 6.36 | 8.77 | 849 | 5.4 | 1.8 | 120 | 1353 | 3.3 |
| 1h | 12.43 | 17.38 | 616 | 16.17 | 8.36 | 501 | 3.2 | 1.8 | 60 | 1117 | 4.5 |
| 1i | 10.12 | 18.45 | 588 | 8.47 | 6.81 | 744 | 4.4 | 1.8 | 100 | 1332 | 3.4 |
| 1k | 10.12 | 18.45 | 336 | 8.47 | 6.81 | 425 | 4.4 | 1.8 | 100 | 761 | 4.2 |

EXAMPLES 2a TO 2i

In these examples, the batch and concentration ratios during the precipitation were kept constant, whereas the splitting of one of the two components into partial streams and the temperature were varied. The aluminate solution and the silicate solution were dosed according to Example 1e, thus with a total of 410 kg of aluminate solution (12.43% $Al_2O_3$ and 17.38% $Na_2O$) per hour as well as with a total of 525 kg of silicate solution (10.26% $SiO_2$ and 7.66% $Na_2O$) per hour. From this resulted a total molar ratio in the precipitation batch of:

3.6 $Na_2O$:1.0 $Al_2O_3$:1.8 $SiO_2$:80 $H_2O$.

The aluminate solution was prepared from technical grade sodium meta-aluminate.

The splitting of the components (aluminate solution or silicate solution) into partial streams of different sizes as well as the temperature of the components can be seen from the data in Table 2.

The amorphous reaction mixtures leaving the flowing tube reactor continuously had a temperature corresponding to the precipitation temperature, was always homogeneous and had good flow capability. The proportion of granules larger than 50μ were less than 1% by weight.

The products obtained after 40 minutes of crystallization were identified in all cases as highly crystalline molecular sieve NaA still containing bound water and having a chemical composition corresponding to the molar ratios of:

1.0 $Na_2O$.1.0 $Al_2O_3$.1.8 $SiO_2$

The calcium binding capacity was at or above 155 mg CaO/gm AS. All products had an average particle size of less than 7μ and granule size proportions of less than 10μ exceeding 95% by volume. The wet screening residue according to Mocker was less than 1% by weight.

The hexahedral crystallites had mainly rounded edges and a length of 0.5 to 3μ for the edges.

The following Table 2 shows examples with different splitting of the components and variations of precipitation temperature (dosing and molar ratios in the total batch corresponding to Example 1e, see Table 1).

TABLE 2

| Example | Splitting of the Aluminate Solution in % Portions | Splitting of the Silicate Solution in % Portions | Precipitation Temperature | Average Particle Size in μ | CaBC |
|---|---|---|---|---|---|
| 1e | 50 + 30 + 10 + 10 | Unsplit | 65° C. | 3.9 | 165 |
| 2a | 60 + 20 + 20 | | | 4.2 | 168 |
| 2b | 50 + 30 + 20 | Unsplit | 65° C. | 4.2 | 164 |
| 2c | 40 + 40 + 20 | | | 4.3 | 163 |
| 2d | 60 + 20 + 10 + 10 | Unsplit | 65° C. | 4.2 | 172 |
| 2e | 40 + 30 + 20 + 10 | | | 4.1 | 168 |
| 2f | 50 + 30 + 10 + 10 | Unsplit | 80° C. | 3.6 | 155 |
| 2g | | 50 + 30 + 10 + 10 | 65° C. | 4.8 | 157 |
| 2h | Unsplit | 40 + 30 + 20 + 10 | 65° C. | 5.0 | 160 |
| 2i | | 40 + 40 + 20 | 50° C. | 5.4 | 155 |

The preceding specific embodiments are illustrative of the practice of the invention. It is to be understood, however, that other expedients known to those skilled in the art or described herein, may be employed without departing from the spirit of the invention or the scope of the appended claims.

We claim:

1. A process for the continuous production of an aqueous, alkaline suspension of x-ray amorphous sodium aluminosilicate having a small particle size of at least 99% by volume of a particle size of less than 50μ, suitable for conversion into zeolite sodium aluminosilicate of the smallest particle sizes, by mixing an aqueous sodium aluminate solution with an aqueous sodium silicate solution in the presence of excess sodium hydroxide solution at a temperature in the range of from 20° to 103° C., where the solutions being mixed have a mathematical total molar ratio of:

1.5 to 9 $Na_2O$:1 $Al_2O_3$:1 to 7 $SiO_2$:40 to 400 $H_2O$ consisting essentially of the steps of continuously passing one of said two aqueous solutions into the entrance of an elongated substantially circular cross-sectional reaction zone having a ratio of length to diameter of more than 500, continuously splitting the other aqueous solution into at least three partial streams, continuously passing the first of said partial streams into said entrance, continuously passing the mixed contents through said elongated reaction zone divided into a first zone where the mean holding time is from 5 to 60 seconds into a second zone of said elongated reaction zone, continuously passing the remainder of said partial streams separately into downstream zones of said elongated reaction zone, where said mean holding time of the reaction mixture in each of said separate zones of said elongated reaction zone is at least 5 seconds and sufficient to effect substantial mixing of said contents, the mean holding time in the entirety of said elongated substantially circular cross-section reaction zone being at least 3 minutes.

2. The process of claim 1 wherein said first of said partial streams contain from 40% to 60% of the total amount of said split other aqueous solution.

3. The process of claim 2 wherein the remainder of the total amounts of said split other aqueous solution is split into from two to four partial streams, streams two to four, where stream two is equal or greater in amount than streams three and four.

4. The process of claims 1 wherein said split other aqueous solution is said aqueous sodium aluminate solution.

5. The process of claim 2 wherein said split other aqueous solution is said aqueous sodium aluminate solution.

6. The process of claim 3 wherein said split other aqueous solution is said aqueous sodium aluminate solution.

7. The process of claims 1,2,3,4,5, or 6 wherein said temperature is maintained constant within ±2° C. at a range of from 50° C. to 80° C.

8. The process of claims 1,2,3,4,5, or 6 wherein the total amount of said aqueous sodium aluminate solution and said aqueous sodium silicate solution in the presence of excess sodium hydroxide solution is introduced into said elongated, substantially circular cross-sectional reaction zone at an overall rate of from 2 to 20 m$^3$ of solution per cubic meter of mixing area per hour and mean holding time in said reaction zone is from 3 to 30 minutes.

9. The process of claims 1,2,3,4,5, or 6 wherein the total amount of said aqueous sodium aluminate solution and said aqueous sodium silicate solution in the presence of excess sodium hydroxide solution is introduced into said elongated, substantially circular cross-sectional reaction zone at an overall rate of from 3 to 20 m$^3$ of solution per cubic meter of mixing area per hour and mean holding time in said mixing area is from 5 to 20 minutes.

10. The process of claims 1,2,3,4,5, or 6 wherein the mean holding time of the reaction mixture in each of said separate zones of said elongated reaction zone is from 5 to 60 seconds.

* * * * *